(12) United States Patent
Barsness et al.

(10) Patent No.: US 8,032,514 B2
(45) Date of Patent: Oct. 4, 2011

(54) SQL DISTINCT OPTIMIZATION IN A COMPUTER DATABASE SYSTEM

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1764 days.

(21) Appl. No.: 11/035,554

(22) Filed: Jan. 14, 2005

(65) Prior Publication Data

US 2006/0161515 A1 Jul. 20, 2006

(51) Int. Cl.
*G06F 17/30* (2006.01)
(52) U.S. Cl. ...................................................... 707/713
(58) Field of Classification Search ............... 707/5, 705, 707/713, 714, 716
See application file for complete search history.

(56) References Cited

U.S. PATENT DOCUMENTS

| | | | | |
|---|---|---|---|---|
| 5,890,148 A * | 3/1999 | Bhargava et al. | ..................... | 1/1 |
| 6,029,163 A * | 2/2000 | Ziauddin | ............................... | 1/1 |
| 6,061,676 A * | 5/2000 | Srivastava et al. | ............. | 707/694 |
| 6,088,691 A * | 7/2000 | Bhargava et al. | ............. | 707/714 |
| 6,105,018 A * | 8/2000 | Demers et al. | ......................... | 1/1 |
| 6,615,203 B1* | 9/2003 | Lin et al. | ............................... | 1/1 |
| 2004/0225639 A1* | 11/2004 | Jakobsson et al. | ................ | 707/2 |

\* cited by examiner

*Primary Examiner* — Angela Lie
(74) *Attorney, Agent, or Firm* — Martin & Associates, LLC; Bret J. Petersen (57) ABSTRACT

An apparatus and method optimize a query in a computer database system having a DISTINCT specifier. An SQL SELECT statement with a DISTINCT specifier is analyzed to determine if the expression can be optimized, and if so, the SELECT statement is reformulated to improve system performance. In preferred embodiments, the query optimizer eliminates the DISTINCT specifier in the outer select statement to reformulate the query. In other preferred embodiments, a query optimizer reformulates the query before being sent to the database manager to optimize the query to improve system performance.

8 Claims, 5 Drawing Sheets

FIG. 1

| Predicate Expression | | | |
|---|---|---|---|
| Logical Expression | Relational Expression | Unary Expression | Boolean Expression |
| AND<br>OR<br>NOT<br>UNION | <<br>><br><=<br>>=<br>=<br>!= | isNull<br>isNotNull<br>exist<br>NotExist | TRUE<br>FALSE |

FIG. 2

Select * from Table1 where C1=4
AND (C2>6 OR C3!=8)

FIG. 3

C1=4 AND (C2>6 OR C3!=8)

FIG. 4

SELECT DISTINCT Names from Persons
where Age in
(SELECT Age from Persons where
Gender='M')

FIG. 5

Persons

| Name | Age | Gender |
|---|---|---|
| John | 38 | M |
| Mark | 38 | M |
| Paul | 32 | M |
| Lacey | 36 | F |
| Cindy | 44 | F |
| Jason | 76 | M |
| Katy | 22 | F |
| John | 38 | M |
| Paul | 32 | M |
| Cindy | 44 | F |

FIG. 6

SELECT DISTINCT Names from Persons
where Age in
(SELECT DISTINCT Age from Persons where
Gender='M')

FIG. 7

SELECT DISTINCT policyNumber from Policy po
WHERE po.policyID in
(SELECT DISTINCT PolicyID FROM PolicyAcess WHERE holder IN
(SELECT RelatedID FROM Relation WHERE Relative='Husband')

FIG. 8

Policy Table

| Policy Number | PolicyID | Other |
|---|---|---|
| x123 | 1 | other |
| x345 | 2 | other |
| x456 | 2 | other |
| x456 | 2 | other |

FIG. 9

Policy Access Table

| PolicyID | Holder | Other |
|---|---|---|
| 1 | John | other |
| 2 | Mark | other |
| 2 | Mark | other |
| 3 | Paul | other |

FIG. 10

Relation Table

| RelatedID | Relative | Other |
|---|---|---|
| John | son | other |
| Mark | husband | other |
| Mark | husband | other |
| Cindy | wife | other |

FIG. 11

SELECT DISTINCT policyNumber from Policy po
WHERE po.policyID in
(SELECT DISTINCT PolicyID FROM PolicyAcess WHERE holder IN
(SELECT DISTINCT RelatedID FROM Relation WHERE Relative='Husband')

SQL DISTINCT OPTIMIZATION IN A COMPUTER DATABASE SYSTEM

BACKGROUND OF THE INVENTION

1. Technical Field

This invention generally relates to computer systems, and more specifically relates to apparatus and methods for improving access to data in a computer database through optimization of the SELECT query in Structured Query Language (SQL).

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Figure 2:
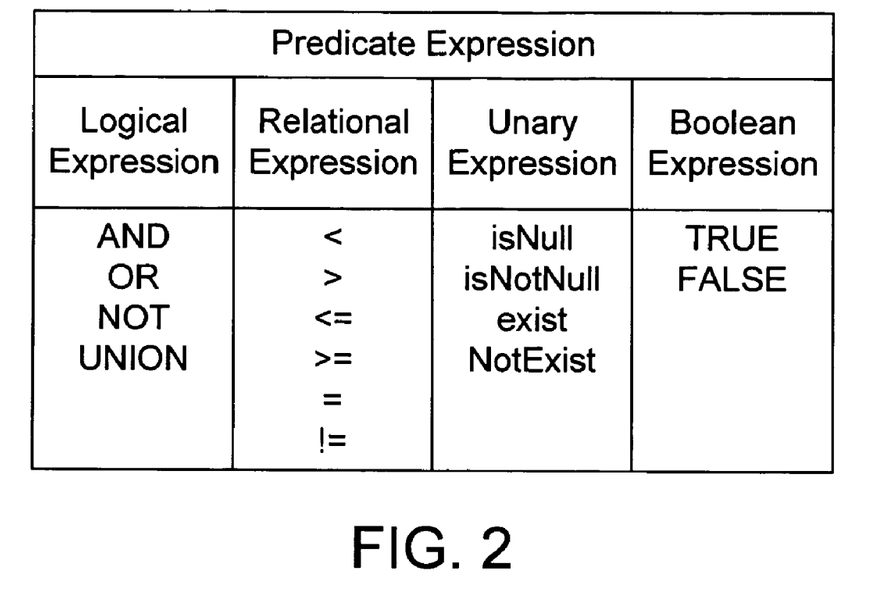
FIG. 2 is a table showing expressions that may be included in a predicate expression in a database query.

Retrieval of information from a database is typically done using queries. A database query typically includes one or more predicate expressions interconnected with logical operators. A predicate expression is a general term given to an expression using one of the four kinds of operators (or their combinations): logical, relational, unary, and boolean, as shown in FIG. 2. A query usually specifies conditions that apply to one or more columns of the database, and may specify relatively complex logical operations on multiple columns. The database is searched for records that satisfy the query, and those records are returned as the query result.

A primary type of SQL query is the SELECT statement. The SELECT statement specifies data to be retrieved from a database table. The SELECT statement has an optional DISTINCT specifier. When the DISTINCT specifier is used with a SELECT statement, it causes the database manager to return only unique column data specified by the SELECT statement by discarding duplicate rows. A duplicate row is when the corresponding data of the SELECTed column has duplicate data. In the known art, a query containing a DISTINCT statement often causes the database unnecessary delay. This occurs when database manager executes the SELECT statement. The execution of the SELECT statement joins tables together in a temporary data structure. When data is duplicated in rows of the table, the joining of the tables for the SELECT statement causes joining of duplicate records that will be discarded anyway by the DISTINCT specifier. This causes an undue burden on system resources and increases access delay to database queries. Without a way to reduce database query time to improve system performance, the computer industry will continue to suffer from excessive delays in database accesses that include the DISTINCT specifier.

DISCLOSURE OF INVENTION

In accordance with the preferred embodiments, an apparatus and method optimize a query with a DISTINCT specifier in a computer database system. An SQL SELECT statement with a DISTINCT specifier is analyzed to determine if the expression can be optimized, and if so, the SELECT statement is reformulated to improve system performance. In preferred embodiments, the query optimizer eliminates the DISTINCT specifier in the outer select statement to reformulate the query. In other preferred embodiments, a query optimizer reformulates the query before being sent to the database manager to optimize the query to improve system performance.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to optimizing database queries. For those not familiar with databases or queries, this Overview section provides background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 3:
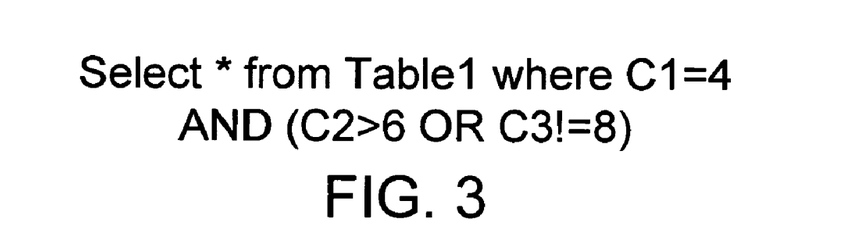
FIG. 3 is a sample database query in Structured Query Language (SQL)

One popular way to define a query uses Structured Query Language (SQL). SQL defines a syntax for generating and processing queries that is independent of the actual structure and format of the database. One sample SQL query is shown in FIG. 3. The SELECT statement tells the database query processor to SELECT all columns, the "from Table1" statement identifies which database table to search, and the WHERE clause specifies one or more expressions that must be satisfied for a record to be retrieved. Note that the query of FIG. 3 is expressed in terms of columns C1, C2 and C3. Information about the internal storage of the data is not required as long as the query is written in terms of expressions that relate to values in columns from tables.

Figure 4:
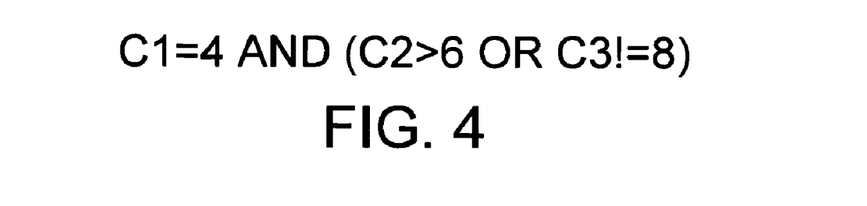
FIG. 4 is a predicate expression that is representative of the WHERE clause in the sample database query of FIG. 2.

For the query of FIG. 3, the WHERE clause specifies that the first column has a value equal to four (C1=4) logically ANDed with the expression that the second column is greater than six OR the third column is not equal to eight. The expression in the WHERE clause of FIG. 3 is shown in FIG. 4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

In the prior art, a tool known as a query optimizer evaluates expressions in a query. When an expression becomes complex, the query optimizer often approaches the expression from multiple perspectives. In many cases, the query optimizer will divide an expression into multiple sub-expressions. However, the prior art query optimizer does not examine the SELECT statement with the DISTINCT specifier to optimize system performance.

2.0 Detailed Description

It was discovered by the inventors herein that a DISTINCT statement in the prior art database systems can often be optimized to achieve increased performance. The preferred embodiments provide an optimized SELECT statement with a DISTINCT specifier for a database computer system. In a preferred embodiment, a database query optimizer processes a SELECT statement with a DISTINCT specifier in a database query, and generates an optimized SELECT statement that reduces the total amount of processing compared to the original SELECT statement.

Figure 1:
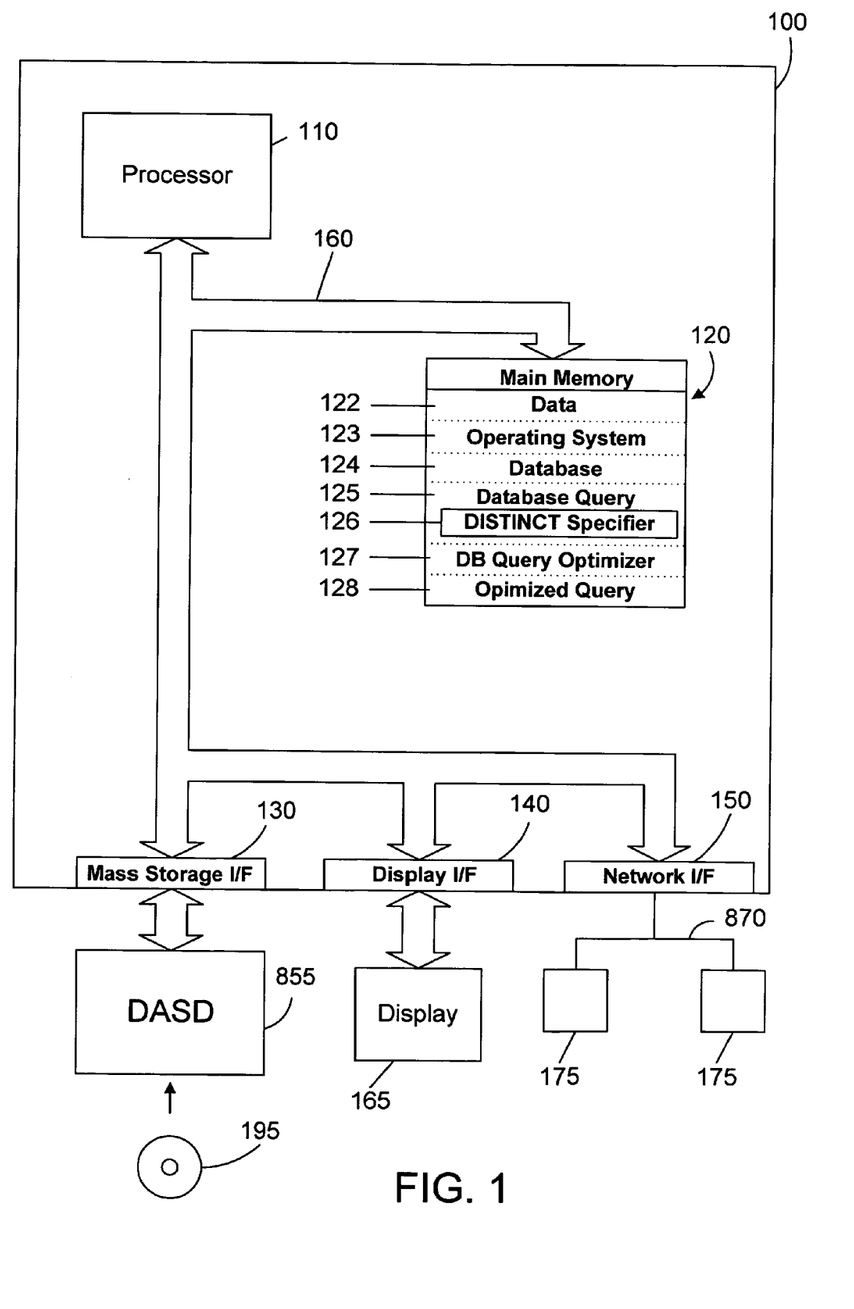
FIG. 1 is an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, one or more database queries 125, a database query optimizer 127, and an optimized query 128. One or more of the database queries 125 may include one or more SELECT statements with a DISTINCT specifier 126. Note that SELECT statements with a DISTINCT specifier 126, the database query optimizer 127, and the optimized query 128 are described in further detail below.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 is any suitable database, whether currently known or developed in the future. Database query 125 is a query in a format compatible with the database 124 that allows information stored in the database 124 that satisfies the database query 125 to be retrieved. Database query optimizer 127 processes one or more expressions in database query 125, including a SELECT query statement with a DISTINCT specifier 126 in accordance with the preferred embodiments. Query optimizer 127 optimizes a query 125 that includes a SELECT query statement with a DISTINCT specifier 126 to generate a corresponding optimized query 128.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, and the database query optimizer 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 5:
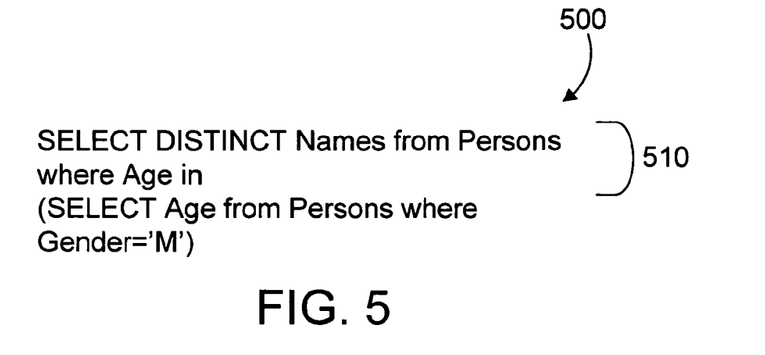
FIG. 5 is a sample SELECT query statement with a DISTINCT specifier used to illustrate a first embodiment.

Referring now to FIG. 5, a query 500 is shown for an example of how a query may be analyzed and reformulated in accordance with preferred embodiments. Query 500 is an illustrative example of a query 125 that resides in main memory 120 shown in FIG. 1. Query 500 has a first SELECT statement with a DISTINCT specifier. The object of the WHERE clause of the first SELECT statement is a second SELECT statement as follows: (SELECT Age From Persons WHERE Gender='M').

Figure 6:
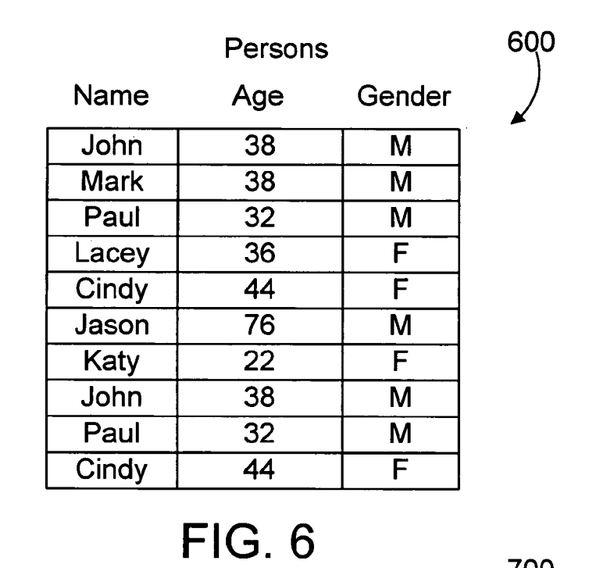
FIG. 6 is a sample database table accessed by the query of FIG. 5.
Figure 7:
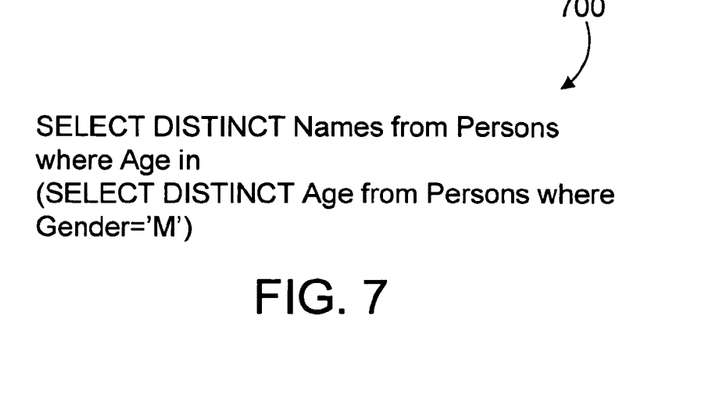
FIG. 7 is an optimized SELECT query statement from the query shown in FIG. 5 according to a first embodiment.

FIG. 6 shows a database table 600 that holds data for the example query shown in FIG. 5. The table 600 is called 'Persons' and has the following columns: 'Name', 'Age" and 'Gender'. Each of the rows in the columns has data as shown for illustration of the first embodiment. When the query of shown in FIG. 5 is operated upon the table 600, the result is as follows:
  John
  Mark
  Paul
  Jason It was discovered by the inventors herein that the DISTINCT statement in the prior art query shown in FIG. 5 can be optimized to achieve increased performance. In a preferred embodiment, the database query optimizer (shown in FIG. 1) processes the SELECT statement shown in FIG. 5, and generates an optimized SELECT statement that reduces the total amount of processing compared to the original SELECT statement. FIG. 7 shows an optimized query 700 that corresponds to the query shown in FIG. 5. In the optimized query 700 a DISTINCT specifier is added to the second SELECT statement. This process of pushing down the DISTINCT specifier avoids the join fanouts that resulted from processing unnecessary join comparisons of duplicate records in the un-optimized query.

If the expression can be optimized, the query optimizer 127 may inform the database administrator that the query is a candidate for a manual process to optimize the query according to an embodiment of the present invention. In other embodiments, the optimization process to reformulate the expression is done automatically by the query optimizer 127.

Figure 8:
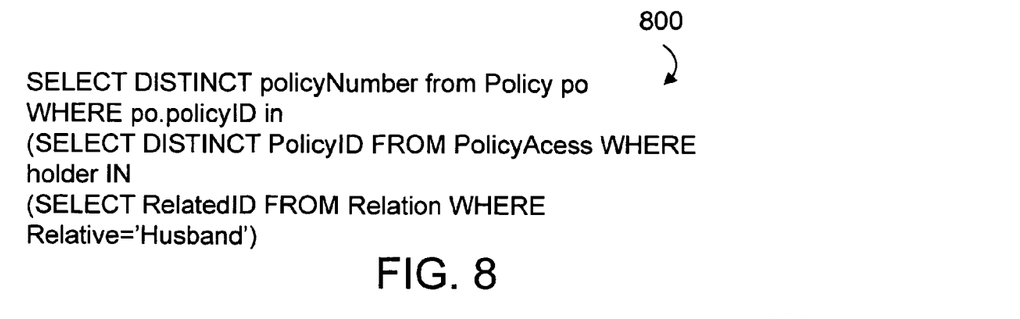
FIG. 8 is second sample SELECT query statement with a DISTINCT specifier used to illustrate a second embodiment.

Referring now to FIG. 8, a query 800 is shown for another example of how the query will be analyzed and reformulated in accordance with preferred embodiments. Query 800 is also an illustrative example of a query 125 that resides in main memory 120 shown in FIG. 1. Query 800 has a first SELECT statement with a DISTINCT specifier. The object of the WHERE clause of the first SELECT statement is a second SELECT statement. The object of the WHERE clause of the second SELECT statement is a third SELECT statement. Each of the SELECT statements include a DISTINCT specifier.

Figure 9:
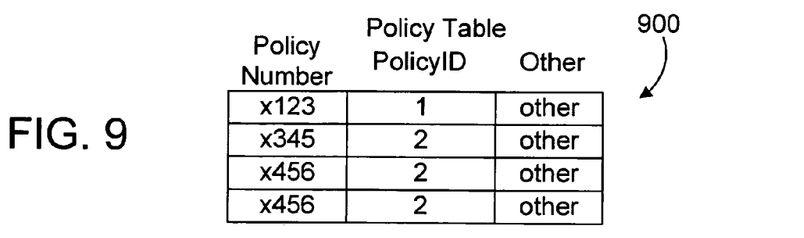
FIG. 9-FIG. 11 are sample database tables accessed by the query of FIG. 8.
Figure 10:
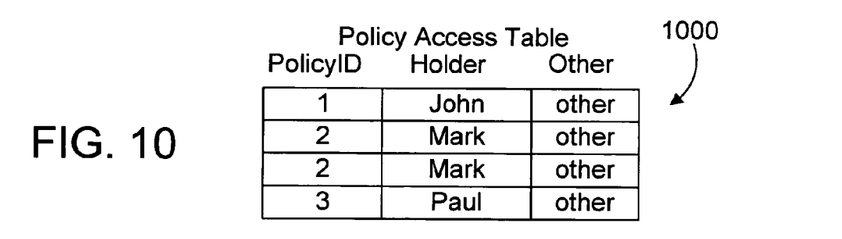
Figure 11:
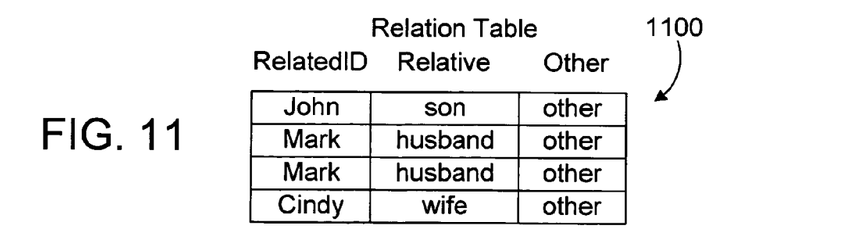
Figure 12:
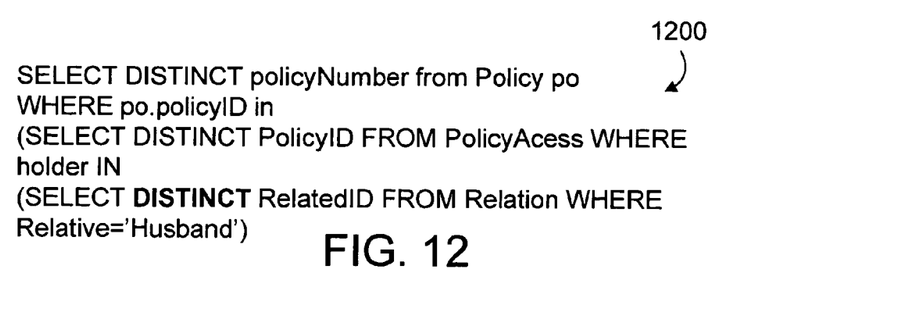
FIG. 12 is an optimized SELECT query statement from the query shown in FIG. 8 according to the second embodiment.

A set of database tables that hold data for the example query shown in FIG. 8 is provided in FIG. 9 through FIG. 11. The first table 900 is called 'Policy' and has the following columns: 'Policy Number', 'PolicyID" and 'Other'. The other column in table 900 and the other tables represent additional data that would be in a table in a real application. Each of the rows in the columns have data as shown for illustration.

When the query of shown in FIG. 8 is executed, the third or inner SELECT statement selects the related id's for columns where the relative=husband, which in the sample table of FIG. 11 is the columns with "Mark" as the related id. The second SELECT statement then selects the PolicyID from the Policy Access table shown in FIG. 10 where the holder is in the result set from the inner select statement. Thus the second select statement selects the PolicyID's for the Holders of "Mark", which corresponds to the two records that have a PolicyID of "2". The outer or first SELECT statement then selects the Policy numbers from the Policy table shown in FIG. 9 where the PolicyID's are those found in the second SELECT statement. Thus the first SELECT statement selects the Policy Numbers for the Policy ID's of "2". The result for the entire SELECT statement in FIG. 8 is then the Policy Numbers as follows:
  x345
  x456

The SELECT statement of FIG. 8 can be optimized by looking the indexes and how they are defined i.e their uniqueness to determine if further optimization could be made. A second DISTINCT keyword may be added to the original query to improve system performance by noting that there is only one unique value for RelatedID in the relation file for each unique set of values of Relative. This information can be harvested from indexes or from database statistics that are updated by the database engine. Please note that with the second type of optimization it is quite possible that the database relationships can span across files. Also, note that if the query were to run often enough it could be effective to have the database engine maintain this statistic if the statistic was not already being maintained via current indexing structures. Thus, in another embodiment, the query optimizer will create an indexing structure for often used queries to provide the database statistic for the optimization as described.

In some cases the outer DISTINCT specifier can be eliminated after adding the DISTINCT specifier to the inner select as shown above. This is possible when the inner select guarantees a unique result set will be passed to the outer select. This would be the case when the DISTINCT columns match or if the database statistics showed the inner select provided a unique result. For instance, in the example above, if the database statistics showed that only one PolicyID existed for every policy number, meaning that PolicyID is unique with Policy number, then the outer DISTINCT specifier could be eliminated to further improve system performance. Since the result set is already unique, the outer DISTINCT specifier will not have any affect on the result and can be ignored.

This concept can be broadened to another embodiment to optimize queries in general. In this embodiment, the optimizer determines if a unique index exists over a field or a set of fields, and if so then eliminates the DISTINCT specifier for the corresponding SELECT statement. The optimizer can substitute use of the unique index for the DISTINCT specifier in each query and pass the optimized query to the database engine as described above.

Figure 13:
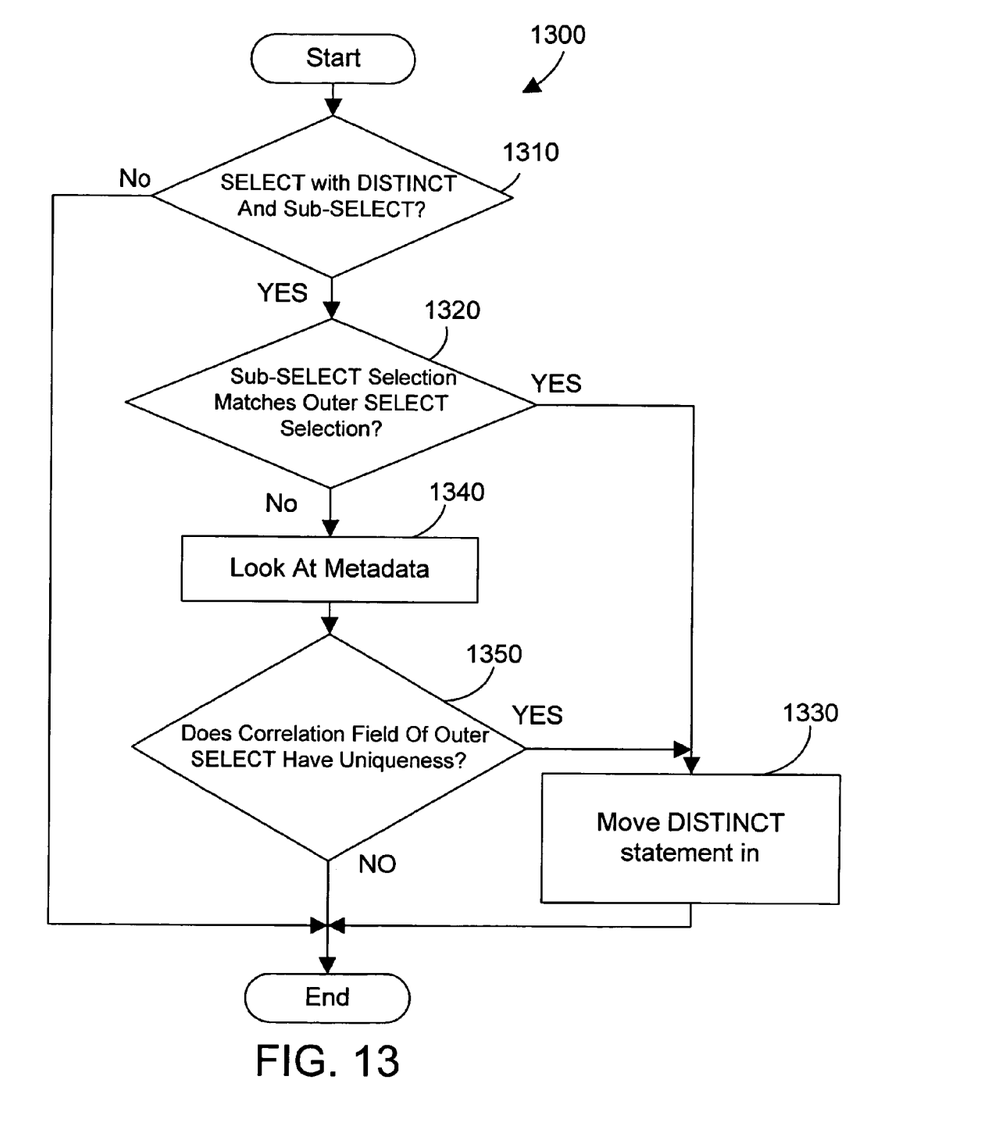
FIG. 13 is a flow diagram illustrating a method according to the preferred embodiments.

Referring now to FIG. 13, method 1300 is illustrated for evaluating a query that includes a SELECT query statement with a DISTINCT specifier in accordance with the preferred embodiments. Method 1300 begins by parsing the query or set of queries to find a sub-SELECT query statement with a DISTINCT specifier (step 1310). Having found a sub-SELECT query statement with a DISTINCT specifier, method 1300 then determines whether the inner sub-select selection matches the outer sub-select selection (step 1320). If the inner sub-select selection matches the outer sub-select selection (step 1320=yes) then the optimizer moves the DISTINCT statement in (step 1330). If the inner sub-select selection does not match the outer sub-select selection (step 1320=no), then the optimizer looks at any metadata of the correlation field of the outer SELECT (step 1340). If the correlation field of the outer SELECT has uniqueness (step 1350=yes) then the optimizer moves the DISTINCT statement in (step 1330) to optimize the query If the correlation field of the outer SELECT does not have uniqueness (step 1350=no) then no optimization can be done and the method 1300 is done.

The present invention as described with reference to the preferred embodiments provides significant improvements over the prior art. An SQL SELECT statement with a DISTINCT specifier is analyzed to determine if the expression can be optimized, and if so, the SELECT statement is reformulated to improve system performance. In preferred embodiment, a query optimizer reformulates the query before being sent to the database manager to optimize the query to improve system performance. The present invention provides a way to reduce database query time to improve system performance, and reduce excessive delays in database accesses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a query residing in the memory that includes an outer SELECT statement with a DISTINCT specifier and an inner SELECT statement;
   a query optimizer residing in the memory and executed by the at least one processor, wherein the query optimizer analyzes the query to determine if the query can be optimized and generates from the query a new query that includes a reformulated SELECT statement with a DISTINCT specifier added to the inner SELECT statement in the query, wherein the query optimizer further determines from database statistics that there is a unique correlation between columns of the inner and outer SELECT statement, and eliminates the DISTINCT specifier to the outer SELECT statement to reformulate the query.

2. An apparatus comprising:
   at least one processor;
   a memory coupled to the at least one processor;
   a query residing in the memory that includes an outer SELECT statement with a DISTINCT specifier and an inner SELECT statement;
   a query optimizer residing in the memory and executed by the at least one processor, wherein the query optimizer analyzes the query to determine if the query can be optimized and generates from the query a new query that includes a reformulated SELECT statement with a DISTINCT specifier added to the inner SELECT statement in the query, wherein the query optimizer determines the query runs often and then creates a data structure to provide unique correlation between database columns, to optimize the query by placing a DISTINCT specifier at the inner SELECT statement to reformulate the query.

3. An apparatus comprising:
   at least one processor;
   a memory coupled to the at least one processor;
   a query residing in the memory that includes an outer SELECT statement with a DISTINCT specifier and an inner SELECT statement; and
   a query optimizer residing in the memory and executed by the at least one processor, wherein the query optimizer analyzes the query to determine if the query can be optimized and generates from the query a new query that includes a reformulated SELECT statement with a DISTINCT specifier added to the inner SELECT statement in the query, wherein the query optimizer further examines at least one index of the columns of the SELECT statement to determine if there are unique values for database columns to determine the query can be optimized by placing a DISTINCT specifier at the inner SELECT statement to reformulate the query.

4. A method for optimizing a database query that contains an outer SELECT statement with a DISTINCT specifier and an inner SELECT statement, the method comprising the steps of:
   analyzing the query to determine if the query can be optimized by adding a DISTINCT specifier to the inner SELECT;
   generating from the query a new query that includes a reformulated SELECT statement with the DISTINCT specifier added to the inner SELECT statement;
   determining from database statistics that there is a unique correlation between columns of the inner and outer SELECT statement and;
   eliminating the DISTINCT specifier to the outer SELECT statement to reformulate the query.

5. A method for optimizing a database query that contains an outer SELECT statement with a DISTINCT specifier and an inner SELECT statement, the method comprising the steps of:
   analyzing the query to determine if the query can be optimized by adding a DISTINCT specifier to the inner SELECT;
   generating from the query a new query that includes a reformulated SELECT statement with the DISTINCT specifier added to the inner SELECT statement;
   determining the query runs often; and
   creating a data structure to provide unique correlation between columns, to optimize the query by placing a DISTINCT specifier at the inner SELECT statement to reformulate the query.

6. A method for optimizing a database query that contains an outer SELECT statement with a DISTINCT specifier and an inner SELECT statement, the method comprising the steps of:

analyzing the query to determine if the query can be optimized by adding a DISTINCT specifier to the inner SELECT;

generating from the query a new query that includes a reformulated SELECT statement with the DISTINCT specifier added to the inner SELECT statement; and examining the indexes of the columns of the SELECT statement to determine if there are unique values for database columns to determine the query can be optimized by placing a DISTINCT specifier at the inner SELECT statement to reformulate the query.

7. A program product comprising:

(A) a query optimizer that analyzes and optimizes a query by performing the following steps:

analyzing the query to determine if the query can be optimized by moving the DISTINCT specifier;

generating from the query a new query that includes a reformulated SELECT statement with a DISTINCT specifier added to the inner SELECT statement;

determining from database statistics that there is a unique correlation between columns of the inner SELECT statement and outer SELECT statement; and eliminating the DISTINCT specifier to the outer SELECT statement to reformulate the query; and (B) computer-recordable media bearing the query optimizer.

8. A program product comprising:

(A) a query optimizer that analyzes and optimizes a query by performing the following steps:

analyzing the query to determine if the query can be optimized by moving the DISTINCT specifier;

generating from the query a new query that includes a reformulated SELECT statement with a DISTINCT specifier added to the inner SELECT statement; and determining the query can be optimized by analyzing at least one index of the columns of the SELECT statement to determine if there is a unique correlation between columns of the inner and outer SELECT to optimize the query by placing a DISTINCT specifier at the inner SELECT statement to reformulate the query; and (B) computer-recordable media bearing the query optimizer.

* * * * *